United States Patent
Fischer et al.

(10) Patent No.: US 8,172,295 B2
(45) Date of Patent: May 8, 2012

(54) HEIGHT ADJUSTING DEVICE FOR THE CARGO FLOOR OF A MOTOR VEHICLE

(75) Inventors: Wolfgang Fischer, Ginsheim-Gustavsburg (DE); Joerg Karger, Hanau (DE); Michael Renkel, Nierstein (DE); Karsten Mau, Gross-Gerau (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/676,570

(22) PCT Filed: Aug. 27, 2008

(86) PCT No.: PCT/EP2008/007010
§ 371 (c)(1),
(2), (4) Date: Mar. 4, 2010

(87) PCT Pub. No.: WO2009/033567
PCT Pub. Date: Mar. 19, 2009

(65) Prior Publication Data
US 2010/0187857 A1    Jul. 29, 2010

(30) Foreign Application Priority Data
Sep. 6, 2007  (DE) .......................... 10 2007 042 371

(51) Int. Cl.
*B60R 5/04* (2006.01)
(52) U.S. Cl. ................................ 296/24.43; 296/37.16
(58) Field of Classification Search ................ 296/24.4, 296/24.43, 24.44, 24.45, 37.16
See application file for complete search history.

(56) References Cited

U.S. PATENT DOCUMENTS

| 6,290,277 | B1 | 9/2001 | Spykerman et al. |
| 7,059,646 | B1* | 6/2006 | DeLong et al. ............ 296/24.43 |
| 7,281,743 | B2 | 10/2007 | Weiland |
| 2006/0016840 | A1 | 1/2006 | Svenson et al. |
| 2007/0018473 | A1* | 1/2007 | Alliger et al. ................ 296/24.4 |

FOREIGN PATENT DOCUMENTS

DE         10261392 A1     7/2004
(Continued)

OTHER PUBLICATIONS

German Patent Office, German Search Report for Application No. 102007042371.5, dated May 30, 2008.
(Continued)

*Primary Examiner* — Dennis Pedder
(74) *Attorney, Agent, or Firm* — Ingrassia Fisher & Lorenz, P.C.

(57) ABSTRACT

A height adjusting device is provided for the cargo floor of a motor vehicle with at least one guide, on which the cargo floor is pivotably guided about a first pivoting axis. The cargo floor can be guided from a lower cargo floor position into an upper cargo floor position. The cargo floor features a rear cargo floor section and a front cargo floor section that are pivotably connected to one another about a second pivoting axis. The cargo floor can be lifted in the region of the second pivoting axis such that the rear and the front cargo floor sections are pivoted relative to one another, and the guide is realized in such a way that the cargo floor is displaced from the lower into the upper cargo floor position along the guide by lifting the cargo floor in the region of the second pivoting axis.

13 Claims, 3 Drawing Sheets

FOREIGN PATENT DOCUMENTS

| | | | |
|---|---|---|---|
| DE | 10305906 | A1 | 9/2004 |
| DE | 102004024609 | A1 | 12/2005 |
| DE | 102009003633 | A1 | 11/2009 |
| DE | 102009003635 | A1 | 12/2009 |
| EP | 1728684 | A1 | 12/2006 |
| EP | 2292468 | A1 | 3/2011 |
| FR | 2828459 | A1 | 2/2003 |
| FR | 2890636 | A1 | 3/2007 |
| FR | 2897806 | A1 | 8/2007 |
| JP | 59149838 | A | 8/1984 |
| JP | 2003291732 | A | 10/2003 |
| WO | 03104035 | A1 | 12/2003 |

OTHER PUBLICATIONS

International Searching Authority, International Search Report for Application No. PCT/EP2008/007010, dated Dec. 15, 2008.
British Patent Office, British Examination Report for Application No. GB1004882.5, dated Aug. 25, 2011.

* cited by examiner

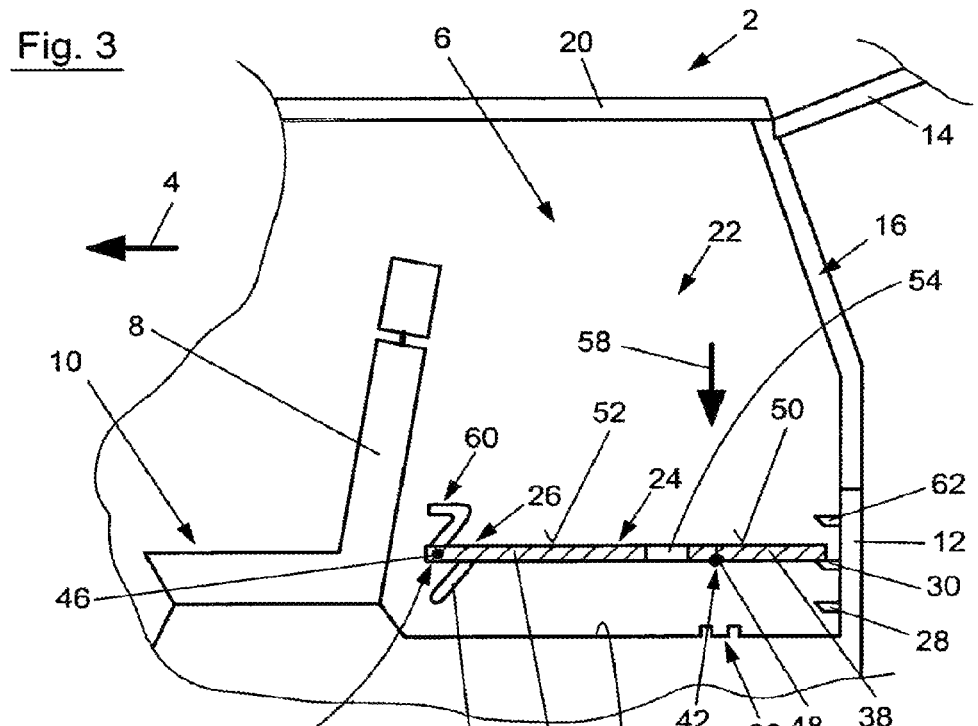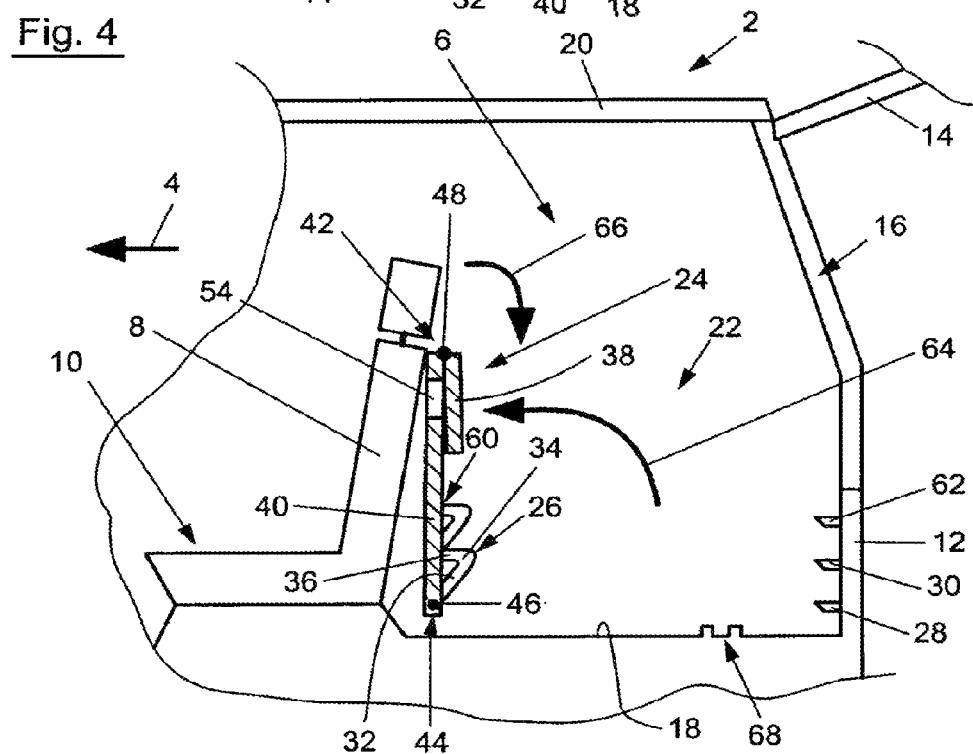

HEIGHT ADJUSTING DEVICE FOR THE CARGO FLOOR OF A MOTOR VEHICLE

CROSS-REFERENCE TO RELATED APPLICATIONS

This application is a U.S. National-Stage entry under 35 U.S.C. §371 based on International Application No. PCT/EP2008/007010, filed Aug. 27, 2008, which was published under PCT Article 21(2) and which claims priority to German Application No. 102007042371.5, filed Sep. 6, 2007, which are all hereby incorporated in their entirety by reference.

TECHNICAL FIELD

The present invention pertains to a height adjusting device for the cargo floor of a motor vehicle with at least one guide, on which the cargo floor is pivotably guided about a first pivoting axis, wherein the cargo floor can be guided from a lower cargo floor position into an upper cargo floor position.

BACKGROUND

Certain height adjusting devices for cargo floors of motor vehicles known from the state of the art are arranged above the cargo floor in a height-adjustable fashion such that they can be displaced from a lower into an upper cargo floor position and vice versa.

For example, WO 03/104035 A1 describes a height adjusting device for a manually height-adjustable cargo floor. The known height adjusting device comprises a one-piece, plate-shaped cargo floor that is pivotably connected to a lever part along a first pivoting axis. The lever part, in turn, is pivotably arranged on the motor vehicle about a second pivoting axis, wherein the second pivoting axis extends parallel to the first pivoting axis. In order to pivot the cargo floor from the upper cargo floor position into the lower cargo floor position, the cargo floor is initially pivoted about the first pivoting axis such that it is arranged at an incline. Subsequently, the lever part is pivoted downward about the second pivoting axis together with the cargo floor such that the cargo floor is pivoted into the lower cargo floor position. In the lower cargo floor position, the cargo floor once again rests on a support surface.

The known height adjusting device has the disadvantage that it is complicated to manipulate the cargo floor during its adjustment between the upper and the lower cargo floor position. Furthermore, the known height adjusting device does not provide an option for displacing the cargo floor into a space-saving stowage position when the cargo floor is not needed.

Consequently, it is at least one objective of the present invention to develop a height adjusting device for the cargo floor of a motor vehicle that allows a simple manipulation of the cargo floor during the adjustment into the different cargo floor positions, as well as a space-saving stowage of the cargo floor when it is not in use. The invention also aims to develop a motor vehicle with such an advantageous height adjusting device. Furthermore, other objectives, aims, desirable features, and characteristics will become apparent from the subsequent summary and detailed description, and the appended claims, taken in conjunction with the accompanying drawings and this background.

SUMMARY

The inventive embodiments for a height adjusting device for the cargo floor of a motor vehicle features at least one guide, on which the cargo floor is pivotably guided about a first pivoting axis. Such guides may be respectively provided, for example, laterally on the car body. The cargo floor can be guided from a lower cargo floor position into an upper cargo floor position along the guide. According to an embodiment of the invention, the cargo floor features two sections, namely a rear cargo floor section and a front cargo floor section. The two cargo floor sections are pivotably connected to one another, for example, with the aid of a hinge. Consequently, the two cargo floor sections can be pivoted relative to one another about a second pivoting axis. The cargo floor can be lifted in the region of this second pivoting axis such that the rear and the front cargo floor sections are pivoted relative to one another. This can preferably be realized due to the own weight of the two cargo floor sections. The guide is furthermore realized in such a way that the cargo floor is displaced from the lower into the upper cargo floor position along the guide by lifting the cargo floor in the region of the second pivoting axis.

Since the two cargo floor sections are partially folded up during the adjustment from the lower into the upper cargo floor position, the cargo floor is altogether less bulky such that the manipulation of the cargo floor during the adjustment is effectively simplified. In addition, a cargo floor consisting of at least two cargo floor sections that are pivotable relative to one another can be accommodated in a stowage position in a much more space-saving fashion. The cargo floor can furthermore be shortened or lengthened by pivoting the cargo floor sections relative to one another, wherein this is required in motor vehicles, the cargo hold of which has a different length at different heights.

In one preferred embodiment of the inventive height adjusting device, the guide is realized in such a way and the cargo floor can be lowered again in the region of the second pivoting axis in such a way that the cargo floor is supported from below on the guide in the upper cargo floor position by lowering the cargo floor in the region of the second pivoting axis. In this case, the person operating the cargo floor initially needs to lift the cargo floor in the region of the second pivoting axis in order to adjust the cargo floor to the corresponding height and then simply lower the cargo floor again in order to transfer the cargo floor into the upper cargo floor position.

In another preferred embodiment of the inventive height adjusting device, the front cargo floor section is guided on the guide.

In another preferred embodiment of the inventive height adjusting device, the front cargo floor section is guided on the guide on its distant section referred to the rear cargo floor section. This may be realized, for example, on the distant edge referred to the rear cargo floor section.

In one particularly preferred embodiment of the inventive height adjusting device, the guide features a first guide section that is inclined in the direction of a cargo hold opening and an adjacent, essentially horizontal second guide section, on which the cargo floor is supported from below in the upper cargo floor position. This guide can be realized in a particularly simple fashion. For example, the guide may include an elongated recess while the cargo floor is provided with a corresponding extension that protrudes into the guide.

In order to achieve a smooth transition into the upper cargo floor position and to thusly ensure a simplified manipulation, the guide according to another particularly preferred embodiment of the inventive height adjusting device furthermore features an arc-shaped intermediate section that is arranged between the first and the second guide section.

In one advantageous embodiment of the inventive height adjusting device, the arc-shaped intermediate section has a curvature that extends from the cargo hold opening to the second guide section. Consequently, the person operating the cargo floor merely needs to displace the cargo floor forward again by lowering the cargo floor in the region of the second pivoting axis in order to support the cargo floor from below in the upper cargo floor position. The arc-shaped intermediate section supports this movement.

In another advantageous embodiment of the inventive height adjusting device, at least one lower projection for supporting the rear cargo floor section in the lower cargo floor position and one upper projection for supporting the rear cargo floor section in the upper cargo floor position are provided on the motor vehicle. The front cargo floor section can be supported in the second guide section whereas the rear cargo floor section can also be securely supported in this fashion.

In one particularly advantageous embodiment of the inventive height adjusting device, the lower projection and/or the upper projection are arranged on the loading edge of the cargo hold opening. Since the rear cargo floor section is pivoted about the second pivoting axis during the adjustment of the cargo floor, there is no risk of the rear cargo floor section contacting one of the projections. Consequently, the projections can be realized correspondingly large and therefore particularly stable. Furthermore, the arrangement on the loading edge allows a simple placement of the cargo floor onto the projections.

In order to further simplify the manipulation of the height adjusting device, a handle, preferably a reach-in or reach-through handle, is provided for lifting the cargo floor on the near section of the front cargo floor section referred to the second pivoting axis in another embodiment of the inventive height adjusting device. In this case, a reach-in or reach-through handle provides the advantage that no raised part that could form an obstruction during loading or unloading is present on the upper side of the cargo floor. The arrangement of the handle on the front cargo floor section is particularly advantageous if the front cargo floor section is guided on the guide because it enables the person operating the cargo floor to apply forces in a particularly purposeful fashion during the adjustment.

In order to realize the adjustment in a particularly comfortable fashion for the person operating the cargo floor, the rear cargo floor section is realized shorter than the front cargo floor section in another preferred embodiment of the inventive height adjusting device. In this case, the shorter dimension refers to the vehicle direction. The person operating the cargo floor is not forced to lean far into the cargo hold opening in order to lift the cargo floor in the region of the second pivoting axis.

In another advantageous embodiment of the inventive height adjusting device, the rear cargo floor section and the front cargo floor section are pivotably connected to one another in such a way that the angle included by the upper sides of the rear and the front cargo floor section always amounts to at least 180°. For example, corresponding stops or a correspondingly designed hinge may be provided in order to ensure an angle of at least 180° between the upper sides of the two cargo floor sections. This primarily ensures that the upper sides are aligned in one plane when the cargo floor is in the lower or upper cargo floor position.

In another preferred embodiment of the inventive height adjusting device, the front cargo floor section can be pivoted into an essentially upright stowage position about the first pivoting axis when the cargo floor is not needed.

In another particularly preferred embodiment of the inventive height adjusting device, the rear cargo floor section can be pivoted into a stowage position about the second pivoting axis, wherein the rear cargo floor section is arranged parallel to the front cargo floor section in this stowage position. For example, the undersides of the cargo floor sections can be folded on top of one another or pivoted toward one another.

In order to reduce the number of moving parts within the motor vehicle, the rear cargo floor section and/or the front cargo floor section can be locked in the respective stowage position in another advantageous embodiment of the inventive height adjusting device.

In order to allow a particularly simple adjustment of the cargo floor into other cargo floor positions, at least one additional guide is provided adjacent to the first guide in another preferred embodiment of the inventive height adjusting device. The design of the second guide may be identical or similar to that of the above-described guide.

In another preferred embodiment of the inventive height adjusting device, a prestressed spring element is provided for supporting the movement of the cargo floor from the lower into the upper cargo floor position. The spring element is preferably provided on the guide. Although the cargo floor needs to be lowered against the prestressing force of the spring element, the complicated lifting into the upper cargo floor position is supported by the prestressing force.

In order to allow, for example, a simple removal of a spare tire that is usually arranged on the rear cargo hold floor or a fast reconfiguration of the cargo hold, the rear cargo floor section can be pivoted into a vertical plane about the second pivoting axis in another particularly preferred embodiment of the inventive height adjusting device, wherein a stationary receptacle is provided for holding and locking the lower edge of the rear cargo floor section in the vertical plane. Such a receptacle may be arranged, for example, on the stationary cargo hold floor. Consequently, it is not necessary to lift or pivot the entire cargo floor in order to reach the spare tire or to increase the height of the cargo hold in the rear region of the motor vehicle. The rear cargo floor section locked in the vertical plane may also serve as a supporting wall for the cargo.

In another particularly preferred embodiment of the inventive height adjusting device, the rear cargo floor section can be locked in the vertical plane in such a way that the front cargo floor section is inclined. The inclined front cargo floor section provides the advantage that the cargo placed thereon always slides into a secure and unchanging position.

The inventive motor vehicle features the above-described height adjusting device according to the invention.

In one preferred embodiment of the inventive motor vehicle, the front cargo floor section has such a length that the front cargo floor section extends to a smaller height than the backrest of a motor vehicle seat arranged in front of the cargo hold floor in the stowage position. This makes it possible to pivot the front cargo floor section into its stowage position about the first pivoting axis such that it does not protrude over the upper edge of the backrest. Consequently, the rear view of the motor vehicle passengers is not restricted. In order to achieve the latter, it is merely required to also pivot the rear cargo floor section into its stowage position, in which it is arranged parallel to the front cargo floor section, about the second pivoting axis.

BRIEF DESCRIPTION OF THE DRAWINGS

The present invention will hereinafter be described in conjunction with the following drawing figures, wherein like numerals denote like elements, and:

FIG. 3 shows the motor vehicle according to FIG. 2 with the cargo floor in an upper cargo floor position;

FIG. 4 shows the motor vehicle according to FIG. 1 with the cargo floor in a stowage position.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
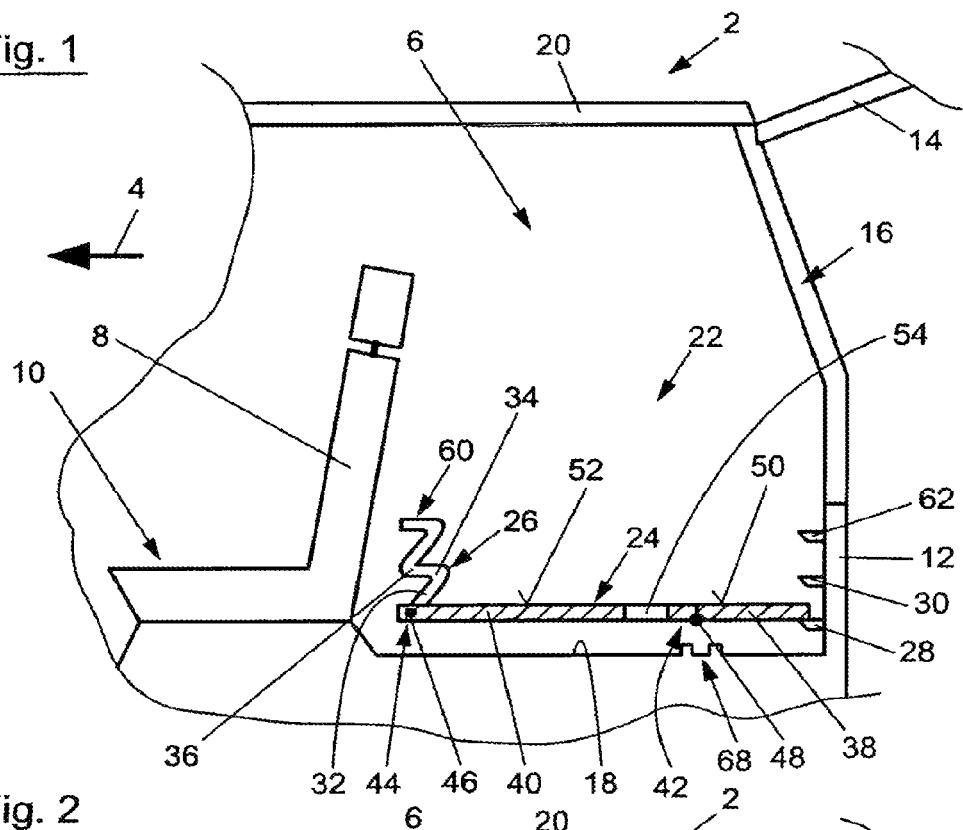
FIG. 1 shows a partial schematic side view of a motor vehicle with an embodiment of the inventive height adjusting device, in which the cargo floor is in a lower cargo floor position.

FIG. 1 shows a side view of the rear section of a motor vehicle 2, wherein the motor vehicle direction is indicated with the arrow 4. The motor vehicle 2 features a cargo hold 6 that is bordered by the backrest 8 of a motor vehicle seat 10 in the rear row of seats toward the front, by a loading edge 12 and a cargo hold hatch 14 that is opened in this case and exposes a cargo hold opening 16 toward the rear, by the cargo hold floor 18 toward the bottom, by the motor vehicle roof 20 toward the top and by the body of the motor vehicle toward the sides.

A height adjusting device 22 is arranged within the cargo hold 6, wherein this height adjusting device is composed of a height-adjustable cargo floor 24 above the cargo hold floor 18, two lateral guides 26, of which only one is illustrated in the figures, as well as a lower and an upper projection 28, 30, wherein the latter are arranged on the inwardly directed side of the loading edge 12.

The guide 26 is realized in the form of an elongated groove that comprises several groove sections. For example, the guide 26 features a lower straight first guide section 32 that obliquely extends upward in the direction of the cargo hold opening 16, i.e., obliquely opposite to the vehicle direction 4, up to an intermediate section 34. The intermediate section 34 is realized in an arc-shaped fashion and curved in such a way that it once again extends forward from the cargo hold opening 16 in the vehicle direction 4 in order to transform into a second guide section 36. The second guide section 36 is essentially realized horizontally. However, it may also be slightly inclined downward.

The cargo floor 24 features a rear cargo floor section 38 and a front cargo floor section 40 that are connected at their facing edges by means of a hinge 42. The two cargo floor sections 38, 40 are respectively realized in a plate-shaped and dimensionally stable fashion. The front cargo floor section 40 is guided on the guide 26 in a distant section referred to the rear cargo floor section 38. For this purpose, the front cargo floor section 40 respectively features a laterally projecting bolt 44 that protrudes into the guide 26. In this case, the bolts 44 form a first pivoting axis 46 that extends transverse to the vehicle direction 4 and makes it possible to pivot the entire cargo floor 24 about the pivoting axis 46.

The hinge 42 forms a second pivoting axis 48, about which the rear and the front cargo floor section 38, 40 can be pivoted relative to one another. In this case, the second pivoting axis 48 also extends transverse to the vehicle direction 4 and parallel to the first pivoting axis 46. The hinge 42 is realized in such a way that the upper sides 50, 52 of the rear and the front cargo floor section 38, 40 always include an angle of at least 180° regardless of the position of the cargo floor 24. This ensures that the upper sides 50, 52 of the cargo floor sections 38, 40 form a plane loading surface in the respective cargo floor positions.

A handle for manually actuating the cargo floor 24 is furthermore provided on the near section of the front cargo floor section 40 referred to the second pivoting axis 48, wherein said handle is realized in the form of a reach-through handle 54. In addition, the rear cargo floor section 38 is shorter than the front cargo floor section 40 referred to the vehicle direction 4, wherein this simplifies the manipulation of the cargo floor 24 because the (not-shown) person operating the cargo floor does not have to lean as far into the cargo hold 6 through the cargo hold opening 16 in order to access the reach-through handle 54.

Other characteristics of the height adjusting device 22, as well as the function thereof, are described below with reference to FIG. 1 to FIG. 3. In FIG. 1, the cargo floor 24 is in a lower cargo floor position. The front cargo floor section 40 is supported from below in the first guide section 32 of the guide 26 by the bolts 44 while the rear cargo floor section 38 is supported from below on the lower projection 28. The upper sides 50, 52 lie in one plane.

Figure 2:
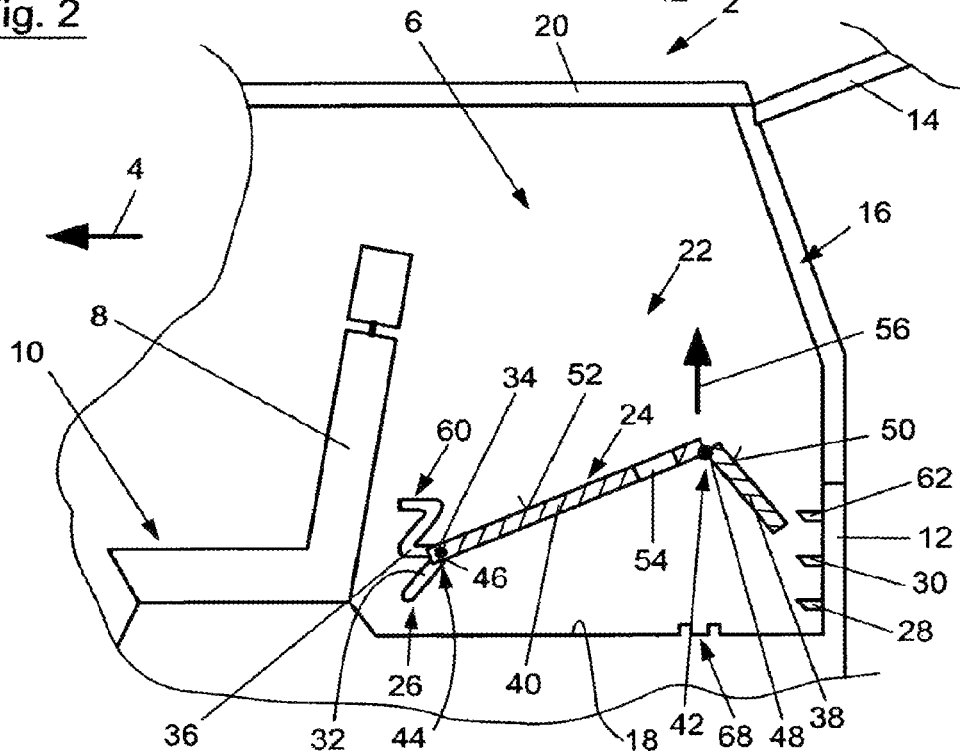
FIG. 2 shows the motor vehicle according to FIG. 1 with the cargo floor in an intermediate position.

In order to guide the cargo floor 24 into a higher cargo floor position, the cargo floor 24 can be lifted in the region of the second pivoting axis 48 with the aid of the reach-through handle 54 as indicated with the arrow 56 in FIG. 2. During this process, the front cargo floor section 40 and the rear cargo floor section 38 are already pivoted about the second pivoting axis 48 due to their own weight. Consequently, the cargo floor 24 is not only less bulky, but the upward movement is also not impaired by the upper projection 30 because the rear cargo floor section 38 is pivoted. Due to the lifting of the cargo floor, the bolt 44 is guided obliquely upward in the first guide section 32 until it reaches the intermediate section 34, in which its moving direction changes. This is also supported by a (not-shown) prestressed spring element on the guide 26. In this case, the spring element is realized in such a way that it supports the movement of the cargo floor 24 from the lower into the upper cargo floor position.

Subsequently, the cargo floor 24 can be lowered again in the region of the second pivoting axis 48 as indicated with the arrow 58 in FIG. 3. During this process, the bolt 44 is guided in the horizontal second guide section 36, in which the bolt 44 and therefore the cargo floor 24 are supported from below. The rear cargo floor section 38 is also supported on the upper projection 30 such that the cargo floor is altogether transferred into an upper cargo floor position that is illustrated in FIG. 3. The sides 50, 52 once again lie in one plane in the upper cargo floor position.

In the embodiment shown, the height adjusting device 22 furthermore features a second guide 60 that is designed identical to the first guide 26 and arranged upwardly adjacent to the first guide 26. In addition, another projection 62 is provided above the upper projection 30. Consequently, the cargo floor 24 can also be transferred into an even higher cargo floor position in the above-described fashion.

Another characteristic of the height adjusting device 22 is illustrated in FIG. 4. Accordingly, the bottom of the front cargo floor section 40 can be pivoted about the first pivoting axis 46 (arrow 64) within the first guide section 36 until it reaches an essentially upright stowage position. According to FIG. 4, the front cargo floor section 40 is realized so long that it extends to a smaller height than the backrest 8 of the vehicle seat 10 in the stowage position. The front side of the front cargo floor section 40 therefore is covered by the backrest 8.

In addition, the rear cargo floor section 38 can be pivoted into a stowage position about the second pivoting axis 48 as indicated with the arrow 66. In this stowage position, the rear cargo floor section 38 is arranged parallel to the front cargo floor section 40. The rear sides of the two cargo floor sections 38, 40 face one another and/or lie against one another. The two cargo floor sections 38, 40 can furthermore be locked in their respective stowage positions, but the corresponding locking means are not illustrated in the figures. The cargo floor 24 can be arranged in a particularly space-saving fashion in this stowage position.

However, the cargo floor 24 can also be advantageously used as a cargo hold divider. For example, the rear cargo floor section 38 does not have to be pivoted in the direction of the arrow 66, but may also be arranged upwardly adjacent to the front cargo floor section 40 in the same plane in order to extend up to the vehicle ceiling 20. The cargo floor 24 separates the cargo hold 6 from the passenger compartment arranged in front thereof in this fashion.

Figure 5:
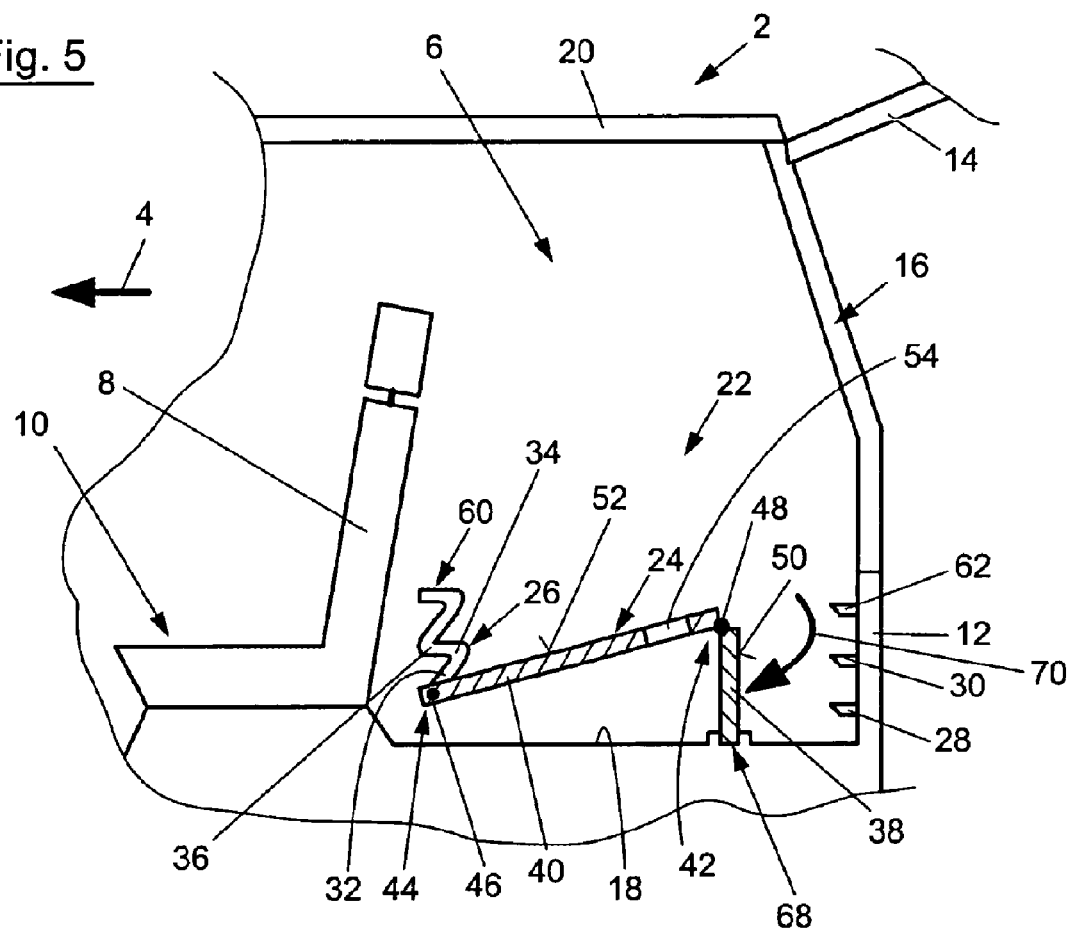
FIG. 5 shows the motor vehicle according to FIG. 1 with the rear cargo floor section locked in a vertical plane within a receptacle.

FIG. 5 shows another characteristic of the height adjusting device 22. A receptacle 68 is provided on the cargo hold floor 18. The rear cargo floor section 38 can be pivoted into a vertical plane about the second pivoting axis 48 as indicated with the arrow 70. The front cargo floor section 40 is also inclined during this process. The as of now bottom edge of the rear cargo floor section 38 can be accommodated and locked in the receptacle 68. Consequently, it is not necessary to lift or pivot the entire cargo floor 24, for example, in order to reach a (not-shown) spare tire on the cargo hold floor 18 or to increase the height of the cargo hold 6 in the rear region of the motor vehicle 2. The rear cargo floor section 38 may also serve as a supporting wall for cargo when it is locked in the vertical plane. The incline of the front cargo floor section 40 furthermore results in a secure storage of the cargo in a predetermined position on the front cargo floor section 40.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

The invention claimed is:

1. A height adjusting device for a cargo floor of a motor vehicle of the type that includes a cargo hold opening having a loading edge portion, the height adjusting device comprising:
   a guide on which the cargo floor is pivotably guided about a first pivoting axis and guided from a lower cargo floor position into an upper cargo floor position;
   a rear cargo floor section of the cargo floor that is pivotably connected to a front cargo floor section of the cargo floor about a second pivoting axis;
   a lower projection extending inwardly from the loading edge portion and adapted to support the rear cargo floor section in the lower cargo floor position; and
   an upper projection extending inwardly from the loading edge portion and adapted to support the rear cargo floor section in the upper cargo floor position;
   wherein the cargo floor can be lifted in a region of the second pivoting axis such that the rear cargo floor section is adapted to pivot relative to the front cargo floor section,
   wherein the guide is realized such that the cargo floor is adapted to be displaced from the lower cargo floor position into the upper cargo floor position along the guide by lifting the cargo floor in the region of the second pivoting axis; and
   wherein the guide comprises a continuous elongated groove having an essentially horizontal section longitudinally aligning with the upper projection, an inclined section beneath the essentially horizontal section and including a lower terminal end longitudinally aligning with the lower projection, and an arc-shaped section between the essentially horizontal section and the inclined section.

2. The height adjusting device according to claim 1, wherein the guide and the cargo floor can be lowered again in the region of the second pivoting axis such that the cargo floor is supported from below on the guide in the upper cargo floor position by lowering the cargo floor in the region of the second pivoting axis.

3. The height adjusting device according to claim 1, further comprising a handle formed through the front cargo floor section.

4. The height adjusting device according to claim 1, wherein the rear cargo floor section is shorter than the front cargo floor section.

5. The height adjusting device according to claim 1, wherein the rear cargo floor section and the front cargo floor section are pivotably connected such that, when the rear cargo floor section and the front cargo floor section are positioned such that the upper surfaces thereof form an angle of approximately 180°, the rear cargo floor section can only pivot with respect to the front cargo floor section in a downward direction.

6. The height adjusting device according to claim 1, wherein the front cargo floor section is adapted to pivot into an essentially upright stowage position about the first pivoting axis.

7. The height adjusting device according to claim 1, wherein the rear cargo floor section is adapted to be pivot into a stowage position in which the rear cargo floor section is arranged substantially parallel to the front cargo floor section about the second pivoting axis.

8. The height adjusting device according to claim 6, wherein the vehicle includes a seat having a backrest, and wherein the front cargo floor section resides in a generally upright position adjacent the backrest in the stowage position.

9. The height adjusting device according to claim 1, further comprising a second guide arranged adjacent to the guide.

10. The height adjusting device according to claim 1, wherein the rear cargo floor section is adapted to pivot into a vertical plane about the second pivoting axis, further comprising a stationary receptacle adapted to hold and lock a lower edge of the rear cargo floor section in the vertical plane, and wherein the rear cargo floor section is adapted to lock in the vertical plane while inclining the front cargo floor section.

11. A motor vehicle of the type that includes a cargo hold opening having a loading edge portion, the motor vehicle comprising:
   a cargo floor;
   a vehicle seat having a backrest and arranged in front of the cargo floor in a stowage position; and
   a height adjusting device adapted to adjust the cargo floor, comprising:

a guide on which the cargo floor is pivotably guided about a first pivoting axis and guided from a lower cargo floor position into an upper cargo floor position;

a rear cargo floor section of the cargo floor that is pivotably connected to a front cargo floor section of the cargo floor about a second pivoting axis;

a lower projection extending inwardly from the loading edge portion and adapted to support the rear cargo floor section in the lower cargo floor position; and an upper projection extending inwardly from the loading edge portion and adapted to support the rear cargo floor section in the upper cargo floor position;

wherein the cargo floor can be lifted in a region of the second pivoting axis such that the rear cargo floor section is adapted to pivot relative to the front cargo floor section, wherein the guide is realized such that the cargo floor is adapted to be displaced from the lower cargo floor position into the upper cargo floor position along the guide by lifting the cargo floor in the region of the second pivoting axis; and wherein the guide comprises a continuous elongated groove having an essentially horizontal section longitudinally aligning with the upper projection, an inclined section beneath the essentially horizontal section and including a lower terminal end longitudinally aligning with the lower projection, and an arc-shaped section between the essentially horizontal section and the inclined section.

12. The motor vehicle according to claim 11, further comprising a handle formed through the front cargo floor section.

13. The height adjusting device according to claim 1, further comprising:

a third projection positioned immediately above the upper projection and extending inwardly from the loading edge portion; and a second guide integrally formed with the first guide and having an essentially horizontal section longitudinally aligning with the third projection.

* * * * *